United States Patent
Sun et al.

(10) Patent No.: US 12,235,886 B2
(45) Date of Patent: Feb. 25, 2025

(54) COGNITIVE RECOGNITION AND REPRODUCTION OF STRUCTURE GRAPHS

(71) Applicant: International Business Machines Corporation, Armonk, NY (US)

(72) Inventors: Sheng Yan Sun, BeiJing (CN); Shuo Li, Beijing (CN); Xiaobo Wang, Beijing (CN); Hong Mei Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 489 days.

(21) Appl. No.: 17/572,190

(22) Filed: Jan. 10, 2022

(65) Prior Publication Data

US 2023/0222150 A1    Jul. 13, 2023

(51) Int. Cl.
*G06F 16/35*    (2019.01)
*G06F 16/358*   (2025.01)
(Continued)

(52) U.S. Cl.
CPC .......... *G06F 16/358* (2019.01); *G06F 40/284* (2020.01); *G06F 40/30* (2020.01); *G06F 40/40* (2020.01); *G06V 10/454* (2022.01)

(58) Field of Classification Search
CPC ........ G06F 16/35; G06F 40/284; G06F 40/40; G06V 10/44
See application file for complete search history.

(56) References Cited

U.S. PATENT DOCUMENTS

| | | | |
|---|---|---|---|
| 11,741,688 B2* | 8/2023 | Xu | G06K 9/46 |
| 2017/0061294 A1* | 3/2017 | Weston | G06N 5/04 |

(Continued)

FOREIGN PATENT DOCUMENTS

| | | |
|---|---|---|
| CN | 106776769 A | 5/2017 |
| CN | 104598436 B | 5/2018 |
| CN | 111259940 A | 6/2020 |

OTHER PUBLICATIONS

Paass et al., Machine Learning for Document Structure Recognition, Jan. 2011.
(Continued)

*Primary Examiner* — Richemond Dorvil
*Assistant Examiner* — Ethan Daniel Kim
(74) *Attorney, Agent, or Firm* — Garg Law Firm, PLLC; Rakesh Garg; Kimberly Zillig

(57) ABSTRACT

An embodiment includes executing a querying process that returns database documents containing text associated with a database environment. The embodiment tokenizes the database documents into a series of n-gram tokens and groups the tokens into topic classes using natural language processing (NLP). The embodiment also generates a feature map by applying a convolution layer to an image that depicts a database structure graph of the database environment. The embodiment detects an architectural element in the image by applying a region proposal network (RPN) to the feature map and classifies the architectural element into one of the plurality of topic classes using a trained neural network. The embodiment renders, responsive to a user selection of the architectural element, an overlay depicting information about the architectural element using text and other architectural elements that are in a same topic class as the user-selected architectural element.

20 Claims, 10 Drawing Sheets

(51) Int. Cl.
  *G06F 40/284*  (2020.01)
  *G06F 40/30*   (2020.01)
  *G06F 40/40*   (2020.01)
  *G06V 10/44*   (2022.01)

(56) References Cited

U.S. PATENT DOCUMENTS

| | | |
|---|---|---|
| 2018/0039620 A1 | 2/2018 | Ciulla et al. |
| 2021/0034657 A1* | 2/2021 | Kale .................. G06F 16/48 |
| 2022/0414630 A1* | 12/2022 | Yebes Torres ......... G06Q 20/20 |
| 2023/0005286 A1* | 1/2023 | Yebes Torres ......... G06F 30/416 |

OTHER PUBLICATIONS

Schreiber et al., DeepDeSRT: Deep Learning for Detection and Structure Recognition of Tables in Document Images, Nov. 15, 2017.

Soto, Visual Detection with Context for Document Layout Analysis, Nov. 3-7, 2019.

Khandelwal, Computer Vision: Instance Segmentation with Mask R-CNN, Jul. 31, 2019, https://towardsdatascience.com/computer-vision-instance-segmentation-with-mask-r-cnn-7983502fcad1.

Sitikhu et al., A Comparison of Semantic Similarity Methods for Maximum Human Interpretability, Oct. 31, 2019.

Li et al., GAR: Graph Assisted Reasoning for Object detection, Mar. 5, 2020, 2020 IEEE Winter Conference on Applications of Computer Vision (WACV).

\* cited by examiner

COGNITIVE RECOGNITION AND REPRODUCTION OF STRUCTURE GRAPHS

BACKGROUND

The present invention relates generally to a method, system, and computer program product for data processing. More particularly, the present invention relates to a method, system, and computer program product for cognitive recognition and reproduction of structure graphs.

Artificial intelligence (AI) technology has evolved significantly over the past few years. Modern AI systems include machine learning systems that are achieving human level performance on cognitive tasks like converting speech to text, recognizing objects and images, or translating between different languages. This evolution holds promise for new and improved applications in many industries.

An Artificial Neural Network (ANN)—also referred to simply as a neural network—is an example of a machine learning system that is often used for performing data classification tasks. ANNs are processing devices (algorithms and/or hardware) that are made up of a number of highly interconnected processing elements (nodes) that process information by their dynamic state response to external inputs. ANNs are loosely modeled after the neuronal structure of the mammalian cerebral cortex, but on much smaller scales. A large ANN might have hundreds or thousands of processor units, whereas a mammalian brain has billions of neurons with a corresponding increase in magnitude of their overall interaction and emergent behavior.

A machine learning system that performs data classification is sometimes referred to as a classifier. A classifier is a type of ANN that includes an algorithm that learns a function that separates two or more classes of data. There are many different types of classifiers. Examples include image classifiers that classify images based on what is being depicted (e.g., classifying images as depicting a cat or a dog) and sentiment classifiers that classify text based on what is being expressed (e.g., classifying text as expressing a positive or negative opinion).

A feedforward neural network is an ANN in which connections between the units do not form a cycle. A convolutional neural network (CNN) is an example of a feed-forward ANN that is sometimes used as a classifier. In a CNN, the connectivity pattern between the nodes (neurons) is inspired by the organization of the animal visual cortex, whose individual neurons are arranged to respond to overlapping regions tiling a visual field. As a result, CNNs are particularly efficient in recognizing image features, such as by differentiating pixels or pixel regions in a digital image from other pixels or pixel regions in the digital image. Generally, a CNN is designed to recognize images or parts of an image, such as detecting the edges of an object recognized on the image, for tasks such as image classification.

A recurrent neural networks (RNN) is another example of a type of ANN that is sometimes used as a classifier. An RNN includes recurrent connections (i.e., feedback connections) that form cycles in the network's topology. In an RNN, a neuron feeds back information to itself in addition to passing it to the next neuron in the RNN. Computations derived from earlier inputs are fed back in the network, which gives an RNN a form of short-term memory. Feedback networks, such as RNNs, are dynamic in that the state of an RNN is continuously changing until it reaches an equilibrium point. For this reason, RNNs are particularly well-suited for detecting relationships across time in a given set of data. Long-Short Term Memory (LSTM) and Gated Recurrent Units (GRU) are types of RNNs that include a state-preserving mechanism through built-in memory cells. These types of RNNs are particularly well-suited for multivariate time series data analysis and forecasting, handwriting recognition, natural language processing, and task synthesis.

A deep neural network (DNN) is another example of an ANN that is sometimes used as a classifier. A DNN has multiple hidden layers of units between the input and output layers. Similar to shallow ANNs, DNNs can model complex non-linear relationships. DNN architectures generate compositional models where the object is expressed as a layered composition of image primitives. The extra layers enable composition of features from lower layers, allowing for the potential of modeling complex data with fewer units than a similarly performing shallow ANN.

SUMMARY

The illustrative embodiments provide for cognitive recognition and reproduction of structure graphs. An embodiment includes executing, by a content classifier, a querying process that searches for and returns a first database document and a second database document each containing natural language text associated with a database environment. The embodiment also includes tokenizing, by the content classifier, the first and second database documents into a series of n-gram tokens. The embodiment also includes grouping, by the content classifier, the n-gram tokens into a plurality of topic classes using natural language processing (NLP). The embodiment also includes generating, by a structure classifier, a feature map by applying a convolution layer to an image that depicts a database structure graph of the database environment, where nodes of the database structure graph represent architectural elements of the database environment and edges of the database structure graph represent associations between respective pairs of architectural elements. The embodiment also includes detecting, by the structure classifier, an architectural element in the image by applying a region proposal network (RPN) to the feature map. The embodiment also includes classifying, by the structure classifier, the architectural element as one of into one of the plurality of topic classes using a trained neural network. The embodiment also includes rendering, responsive to detecting a user selection of the architectural element via a graphical user interface that depicts at least a portion of the database structure graph, an overlay depicting information about the architectural element using text and other architectural elements that are in a same topic class as the user-selected architectural element. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
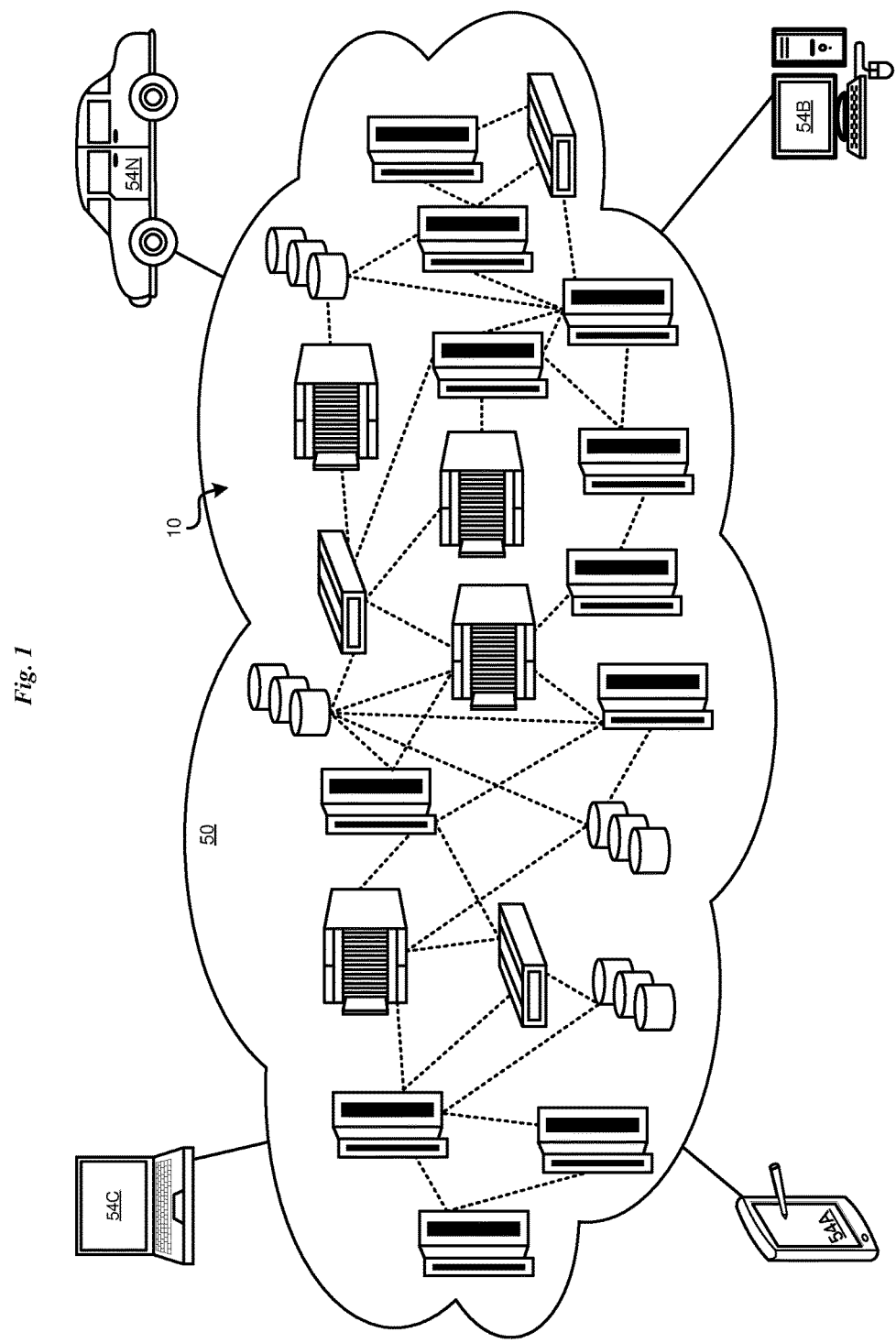
FIG. 1 depicts a cloud computing environment according to an embodiment of the present invention.

A "structure graph," as used herein, is any kind of diagram that includes nodes connected by edges. Typically, the nodes represent elements, which may include physical and conceptual elements, and the edges represent associations between nodes they connect. An example of a structure graph is an architecture diagram of a computer network, such as an architecture diagram of a database environment. In the example of an architecture diagram for a database environment, non-limiting examples of nodes may include such things as hard drives, buffer pools, loggers, cache, resource managers, and process monitors, among many other possibilities.

In modern computing environments, the system architecture may be very complex and may include hundreds or thousands of nodes. In such situations, it is very difficult to find a way to display the architecture in such a way that a user can both understand the organization or structure of the architecture and the details of the nodes.

For example, in some situations, the architecture may be so expansive that undesirable trade-offs are required when deciding how to illustrate the system. For example, if the nodes are large enough to include details in a legible format, then the overall architecture will span several pages and will be difficult to understand. On the other hand, if the architecture is reduced to provide an overall view in a convenient and legible way, the nodes will be too small to legibly display their details.

In addition, many systems may have multiple generations of hardware present and architecture diagrams that are pieced together from various updates or expansions that have occurred. In such situations, it may be difficult to determine how different generations of diagrams fit together and how relevant older diagrams still remain.

In these situations, a user trying to understand the overall system will be faced with a difficult and time-consuming task of locating node details and/or tracing network and system communication lines and other connections. Since this is a manual process, it is also prone to human error, which may further exasperate future issues that arise, such as trying to troubleshoot problems using system notes that include errors.

Aspects of the present disclosure address the deficiencies described above by providing mechanisms (e.g., systems, methods, machine-readable media, etc.) that perform cognitive recognition and reproduction of structure graphs. In illustrative embodiments, the reproduction of a structure graph results in an interactive version of the structure graph that displays details about the structure graph that were aggregated from other sources.

In some embodiments, a cognitive recognition and reproduction process renders a GUI that includes an image depicting a database structure graph of a database environment. Next, the process executes a querying process that searches for and returns database documents containing natural language text associated with the database environment. The process then tokenizes the database documents into a series of n-gram tokens.

In some embodiments, the process groups the n-gram tokens into a plurality of topic classes using NLP. In some embodiments, the process groups the n-gram tokens by analyzing objects returned from the query using an LSI model that measures similarities between database documents based upon similar word usage patterns.

In some embodiments, the process generates one or more feature maps by applying one or more a convolution layers to the of the database structure graph. In some embodiments, the feature maps are generated by convolution layers of an R-CNN.

In some embodiments, the process detects an architectural element in the image by applying an RPN to one of the feature maps. In some embodiments, the RPN creates a bounding box around the detected architectural element in the image. In some such embodiments, the process includes training the R-CNN using a bounding box regression layer associated with a loss function that compares created bounding boxes to ground truth bounding boxes. In some such embodiments, the bounding box regression layer refines center points and dimensions of created bounding boxes based on comparison results with ground truth bounding boxes.

In some embodiments, the process classifies the architectural element as one of the plurality of topic classes using a trained neural network. In some such embodiments, the process classifies architectural elements in each of a plurality of respective bounding boxes. In some such embodiments, the process uses a trained neural network to classify each of the architectural elements.

In some embodiments, the process detects a user selection, via the GUI, of the architectural element of the database structure graph. In some embodiments, the process renders an overlay depicting information about the architectural element using text and other architectural elements that are in a same topic class as the user-selected architectural element.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, training data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefore, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference to FIG. 1, this figure illustrates cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
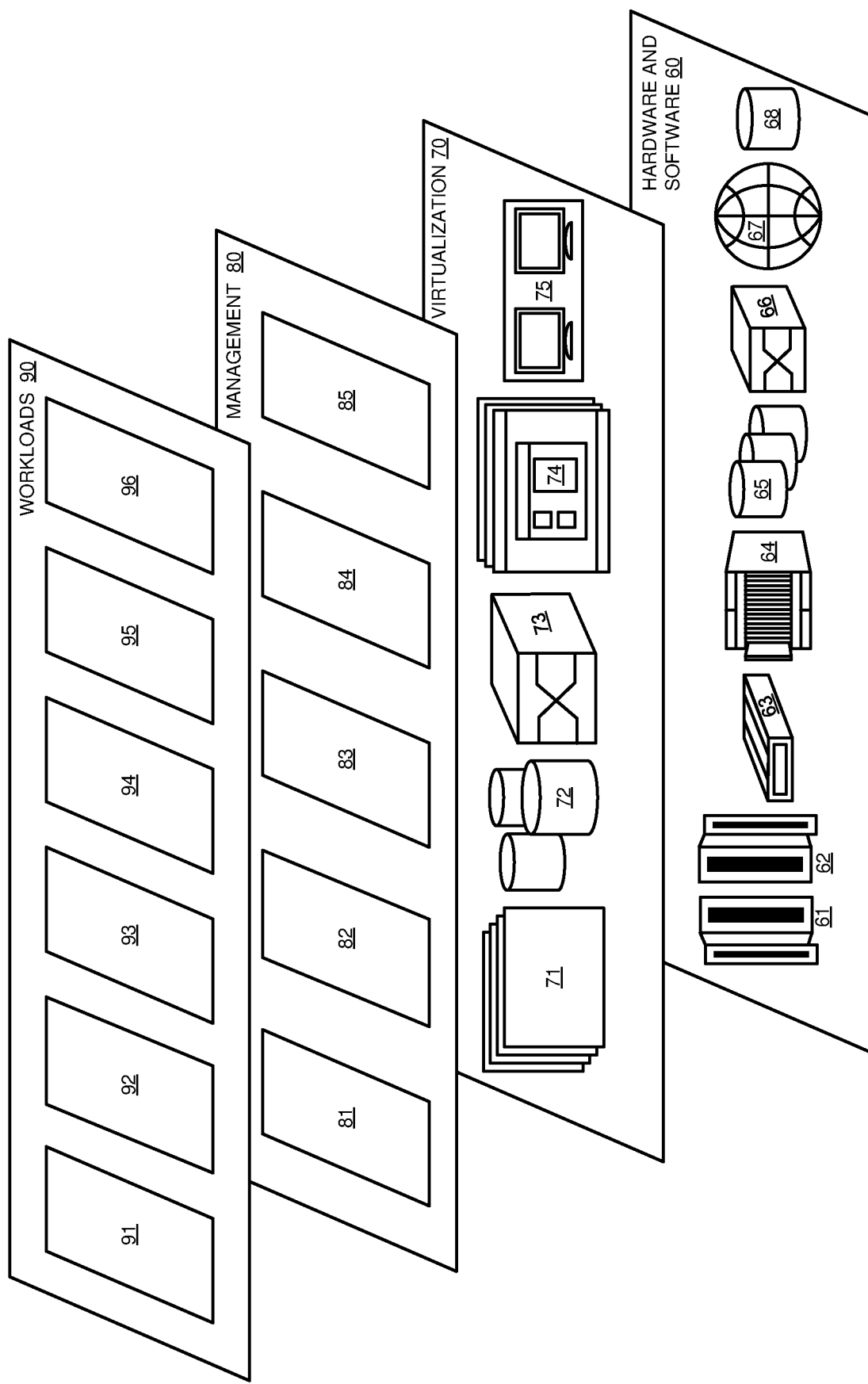
FIG. 2 depicts abstraction model layers according to an embodiment of the present invention.

With reference to FIG. 2, this figure depicts a set of functional abstraction layers provided by cloud computing environment 50 (FIG. 1). It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and in the context of the illustrated embodiments of the present disclosure, various workloads and functions 96 for machine learning processing using training validation. In addition, workloads and functions 96 for cognitive recognition and reproduction of structure graphs may include such operations as data analysis and machine learning (e.g., artificial intelligence, natural language processing, etc.), as described herein. In some embodiments, the workloads and functions 96 for cognitive recognition and reproduction of structure graphs also works in conjunction with other portions of the various abstractions layers, such as those in hardware and software 60, virtualization 70, management 80, and other workloads 90 (such as data analytics processing 94, for example) to accomplish the various purposes of the disclosed embodiments.

Figure 3:
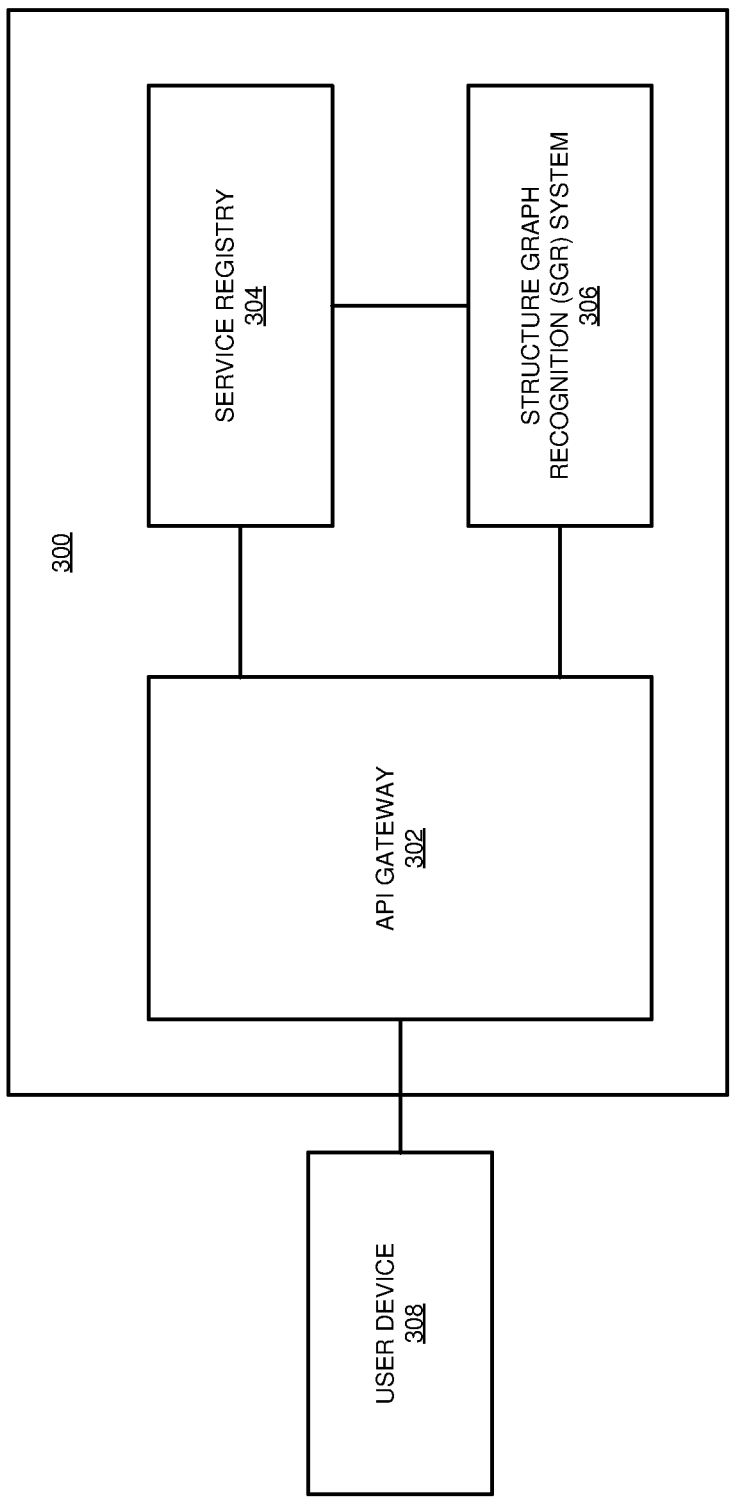
FIG. 3 depicts a block diagram of an example service infrastructure that includes a structure graph recognition (SGR) system in accordance with an illustrative embodiment.

With reference to FIG. 3, this figure depicts a block diagram of an example service infrastructure 300 that includes a structure graph recognition (SGR) system 306 in accordance with an illustrative embodiment. In some embodiments, the SGR system 306 is deployed in workloads layer 90 of FIG. 2. By way of example, in some embodiments, SGR system 306 is implemented as workloads and functions 96 for cognitive recognition and reproduction of structure graphs in FIG. 2.

In the illustrated embodiment, the service infrastructure 300 provides services and service instances to a user device 308. User device 308 communicates with service infrastructure 300 via an API gateway 302. In various embodiments, service infrastructure 300 and its associated SGR system 306 serve multiple users and multiple tenants. A tenant is a group of users (e.g., a company) who share a common access with specific privileges to the software instance. Service infrastructure 300 ensures that tenant specific data is isolated from other tenants.

In some embodiments, user device 308 connects with API gateway 302 via any suitable network or combination of networks such as the Internet, etc. and use any suitable communication protocols such as Wi-Fi, Bluetooth, etc. Service infrastructure 300 may be built on the basis of cloud computing. API gateway 302 provides access to client applications like SGR system 306. API gateway 302 receives service requests issued by client applications, and creates service lookup requests based on service requests. As a non-limiting example, in an embodiment, the user device 308 includes a graphical user interface that depicts at least a portion of a structure graph of a database environment, where nodes of the structure graph represent architectural elements of the database environment and edges of the structure graph represent associations between respective pairs of architectural elements.

In the illustrated embodiment, service infrastructure 300 includes a service registry 304. In some embodiments, service registry 304 looks up service instances of SGR system 306 in response to a service lookup request such as one from API gateway 302 in response to a service request from user device 308. For example, in some embodiments, the service registry 304 looks up service instances of SGR system 306 in response to requests from the user device 308 related to detecting a user selection, via the graphical user interface, of an architectural element of the structure graph of the database environment.

In some embodiments, the service infrastructure 300 includes one or more instances of the SGR system 306. In some such embodiments, each of the multiple instances of the SGR system 306 run independently on multiple computing systems. In some such embodiments, SGR system 306, as well as other service instances of SGR system 306, are registered in service registry 304.

In some embodiments, service registry 304 maintains information about the status or health of each service instance including performance information associated each of the service instances. For example, such performance information may include several types of performance characteristics of a given service instance (e.g., cache metrics, etc.). In some embodiments, the extended service registry 304 ranks service instances based on their respective performance characteristics, and selects top-ranking service instances for SGR-related requests. In some such embodiments, in the event that a service instance becomes unresponsive or, unhealthy, the service registry will no longer provide its address or information about this service instance to other services.

Figure 4:
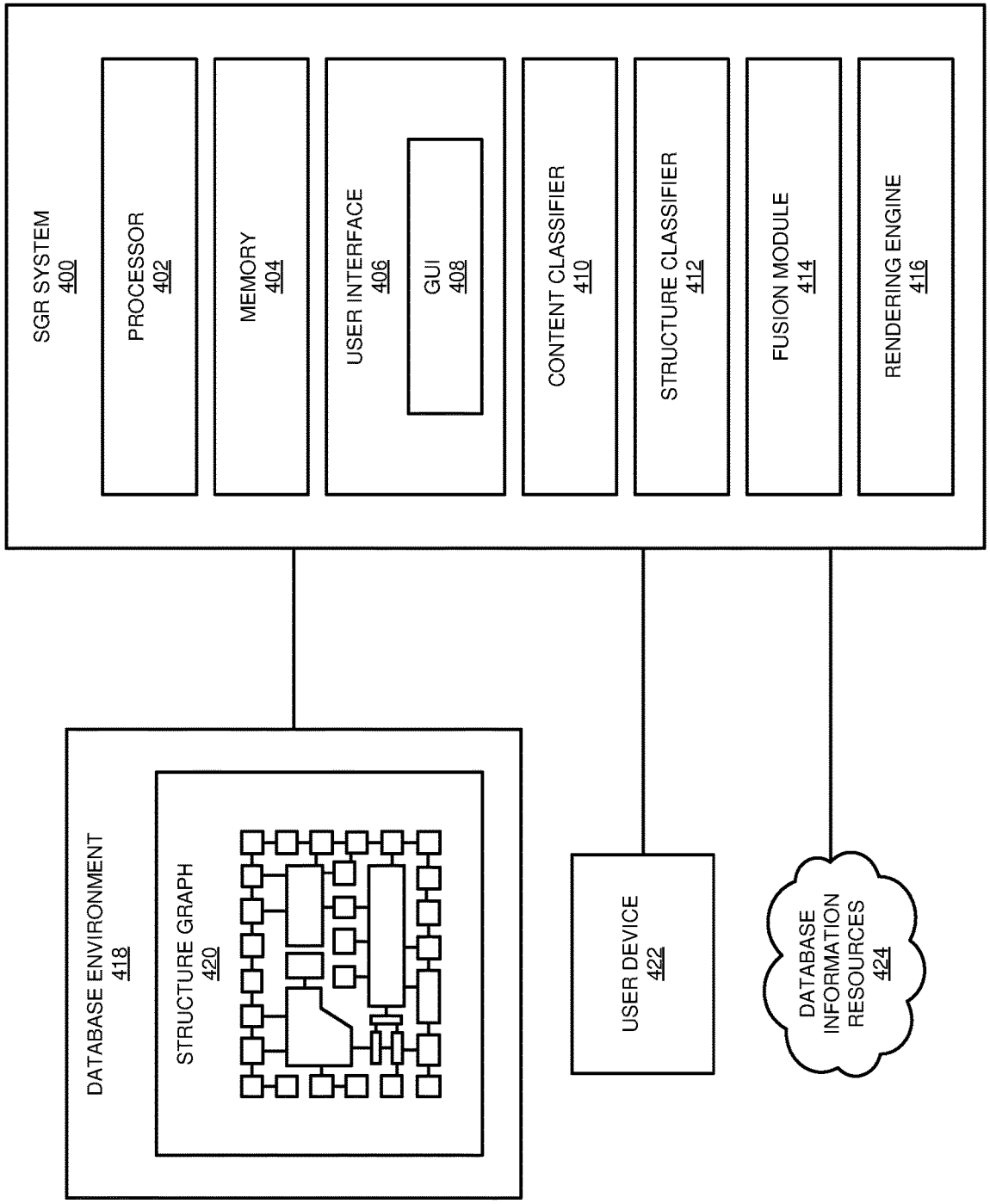
FIG. 4 depicts a block diagram of an example SGR system in accordance with an illustrative embodiment.

With reference to FIG. 4, this figure depicts a block diagram of an example SGR system 400 in accordance with an illustrative embodiment. In a particular embodiment, the SGR system 400 is an example of the workloads and functions 96 for classifier processing of FIG. 1.

In some embodiments, the SGR system 400 includes a processor 402, memory 404, a user interface 406 that includes a graphical user interface (GUI) 408, a content classifier 410, a structure classifier 412, a fusion module 414, and a rendering engine 416. In alternative embodiments, the SGR system 400 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the rendering engine 416 renders a user-interactive depiction of a structure graph 420 of a database environment 418 based on information from the database environment 418 and various other database information resources 424. The rendering engine 416 renders the user-interactive depiction of the structure graph 420 on the GUI 408 that a user may view and interact with via a user device 422. In some embodiments, the user interaction includes detecting and responding to a user selection, via the GUI 408, of an architectural element of the structure graph 420 by automatically and autonomously rendering an overlay depicting information about the user-selected architectural element.

In the illustrated embodiment, the processing unit ("processor") 402 performs various computational and data processing tasks, as well as other functionality. The processing unit 402 is in communication with memory 404. In some embodiments, the memory 404 comprises one or more computer readable storage media with program instructions collectively stored on the one or more computer readable storage media, with the program instructions being executable by one or more processors 402 to cause the one or more processors 402 to perform operations described herein.

The user interface 406, which includes a GUI 408 and may further include a command line interface, allows a user to communicate with the SGR system 400 via the user device 422. For example, in some embodiments, the user interface 406 is configured to recognize and take action in response to requests from the user device 422 related to detecting a user selection, via the GUI 408, of an architectural element of the structure graph 420. In some embodiments, a user device 422 may be any known type of computing device, such as a computer, tablet, or smart phone. In some embodiments, the user interface 406 allows communication with the user device 422 via an API gateway (e.g., API gateway 302 of FIG. 3). In some embodiments, the user interface 406 receives one or more user instructions, user settings, user preferences, and/or other user inputs for the SGR system 400.

In the illustrated embodiment, the rendering engine 416 renders the user-interactive depiction of the structure graph 420 according to data generated by the fusion module 414. The fusion module 414 generates data for the rendering engine 416 by grouping content data received from the content classifier 410 and structure data received from the structure classifier 412.

In the illustrated embodiment, the content classifier 410 and structure classifier 412 receive the structure graph 420 as an image that depicts the descriptions, organization, and interrelationships of architectural elements of the database environment 418. The content classifier 410 analyzes informational aspects of the structure graph 420 and the structure classifier 412 analyzes the organization of the structure graph 420. For example, in some embodiments, the content classifier 410 recognizes text associated with architectural elements of the structure graph 420 based on the image data of the structure graph 420 and other information resources 424 about the database environment. In some such embodiments, the structure classifier 412 recognizes interrelationships between architectural elements of the structure graph 420 based on the image data of the structure graph 420 and other information resources 424 about the database environment. The fusion module 414 then combines the informational information from the content classifier 410 with the organizational information from the structure classifier 412 and provides the combined data to the rendering engine 416 for display to a user via the GUI 408.

Figure 5:
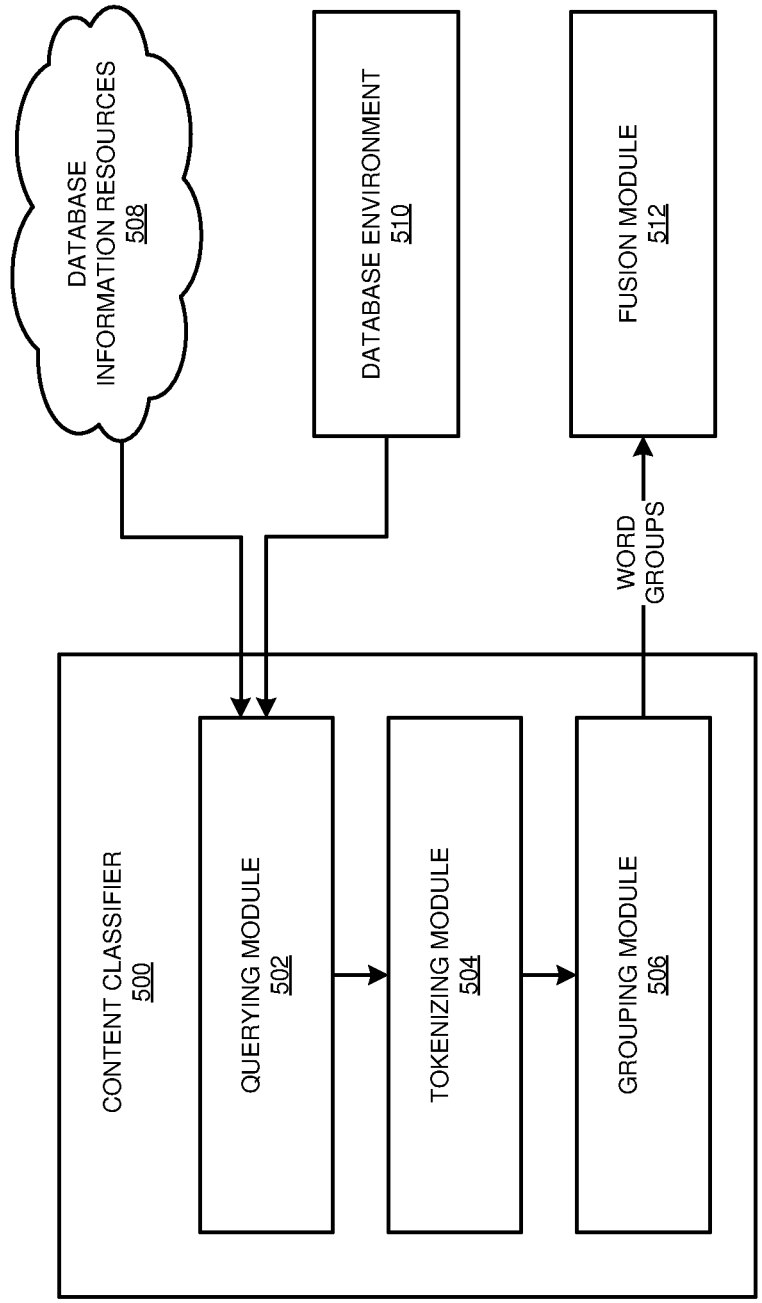
FIG. 5 depicts a block diagram of an example content classifier in accordance with an illustrative embodiment.

With reference to FIG. 5, this figure depicts a block diagram of an example content classifier 500 in accordance with an illustrative embodiment. In a particular embodiment, the content classifier 500 is an example of the content classifier 410 of FIG. 4.

In some embodiments, the content classifier 500 includes a querying module 502, tokenizing module 504, and grouping module 506. The content classifier 500 is in communication with one or more database information resources 508, database environment 510, and fusion module 512, which correspond with the other information resources 424, database environment 418, and fusion module 414, respectively, of FIG. 4. In alternative embodiments, the content classifier 500 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

The database information resources 508 include information about the database environment 510, including information about the specific elements of the database environment 510, such as source code repositories, component descriptions and specifications, database manuals, and database-specific tutorials. In some embodiments, the database information resources 508 include more general database information that is not specific to any particular database, such as computer science dictionaries or general database dictionaries, tutorials, and electronic textbooks. In some embodiments, the database information resources 508 includes more general information not necessarily specific to databases, such as a general language dictionary or thesaurus, such as the one provided with the well-known Natural Language Toolkit (NLTK).

The content classifier 500 receives a structure graph for analysis (e.g., structure graph 420 of FIG. 4) from the database environment 510. In the illustrated embodiment, the querying module 502 receives the structure graph as an image that depicts the descriptions, organization, and inter-relationships of architectural elements of the database environment 510. The content classifier 500 analyzes informational aspects of the structure graph. For example, in some embodiments, the content classifier 500 recognizes text associated with architectural elements of the structure graph based on the image data of the structure graph and other database information resources 508.

When the content classifier 500 receives a structure graph for analysis, the querying module 502 analysis the structure graph and builds queries for database information resources 508 that will allow the content classifier 500 to gather information about the structure graph and its various architectural elements. In some embodiments, the querying module 502 uses natural language processing (NLP) and optical character recognition (OCR) to recognize and extract information from the structure graph. OCR processing allows the querying module 502 to extract text from the structure graph, and NLP allows the querying module 502 to recognize relevant concepts in the extracted text. For example, NLP allows module 502 to associate extracted text with attributes of architectural elements of the structure graph, such as recognizing that certain text represents a name or ID of a device represented by an element, a type of the device, a brand of the device, a model number or serial number of a device, or some characteristic of a device, such as a memory capacity, a processor type, an operating system, or other information about any of the architectural elements of the structure graph.

The extracted text and recognized associations thereof are analyzed by the querying module 502 and used by the querying module 502 as a basis to build queries about the various architectural elements of the structure graph. These queries are used to retrieve additional information about the architectural elements of the structure graph. For example, in some embodiments, if a device name and model number are recognized, the querying module 502 builds a query that includes the device name and model number and may append the words "model number" before the actual model number in the query. Those of ordinary skill in the art will appreciate that there are countless such queries that the querying module 502 may assemble to search the database information resources 508 for additional information about the structure graph.

As the querying module 502 builds these queries, the querying module 502 executes querying processes that involve submitting these queries to the database information resources 508. In some embodiments, the querying module 502 executes a querying process that includes submitting the queries to one or more search engines, including Internet search engines and site-specific search engines or databases that have been preconfigured by a user. The querying module 502 receives documents that are returned in response to the queries, where the documents may include any kind of search result, such as a document in HTML, PDF, image, and/or text format, or any of several other known formats. The querying module 502 forwards the documents to the tokenizing module 504.

The tokenizing module 504 receives the documents from the querying module 502 and generates n-grams from the documents, such as unigrams, bigrams, trigrams, etc. According to at least one embodiment, tokenizing module 504 may generate a gappy n-grams from the documents. Typically, n-gram is a sequence of adjacent elements or tokens from a string that may be a word, a letter, or a symbol. Gappy bigrams, or skipping bigrams, are word pairs which allow gaps between the n-gram elements. For example, if tokenizing module 504 tokenizes a statement from a document where the original statement is "SQL is used to develop database applications" using a gappy bigram, tokenizing module tokenizing module 504 may in addition to tokens "SQL is", "is used", "used to", "to develop", "develop database", and "database applications" add tokens with a gap between the elements such as "SQL, develop", "develop, applications", etc. The tokenizing module 504 provides the n-gram tokens to the grouping module 506.

The grouping module 506 receives the n-gram tokens and groups them into a plurality of topic classes. In some embodiments, the grouping module 506 uses NLP techniques to group the n-gram tokens into topic classes. In some embodiments, the grouping module 506 groups the n-gram tokens into a plurality of topic classes using latent semantic indexing (LSI) for comparing the similarity of data objects, such as words, n-grams, or documents.

In some embodiments, the grouping of the n-gram tokens includes generating a term-by-data object matrix (A) that represents the frequency of term occurrence in the data objects (i.e., documents) received by the querying module 502. In some embodiments, the grouping module 506 reduces the dimensionality of the term-by-data matrix using singular value decomposition (SVD), resulting in a reduced term-by-data matrix $\hat{A}$. The reduced term-by-data object matrix Â is a mathematical representation of the semantic space for the documents received by the querying module 502. Once term-by-document matrix Â has been constructed, the semantic space defined by matrix Â can be examined for a number of similarity relationships between terms or documents, for example based on cosine similarity measurements between vectors of matrix Â.

The resulting similarity values the provide a basis for grouping the terms or documents based on concepts in the semantic space defined by matrix Â. The content classifier 500 groups the words accordingly, and outputs the groups to the fusion module 512. In some embodiments, the grouping module 506 groups the text into predetermined classes of variation. For example, in some embodiments, the classes of variation may include types of elements of a database system, non-limiting examples of which include such things as hard drives, buffer pools, loggers, cache, resource managers, and process monitors, among many other possibilities.

Figure 6:
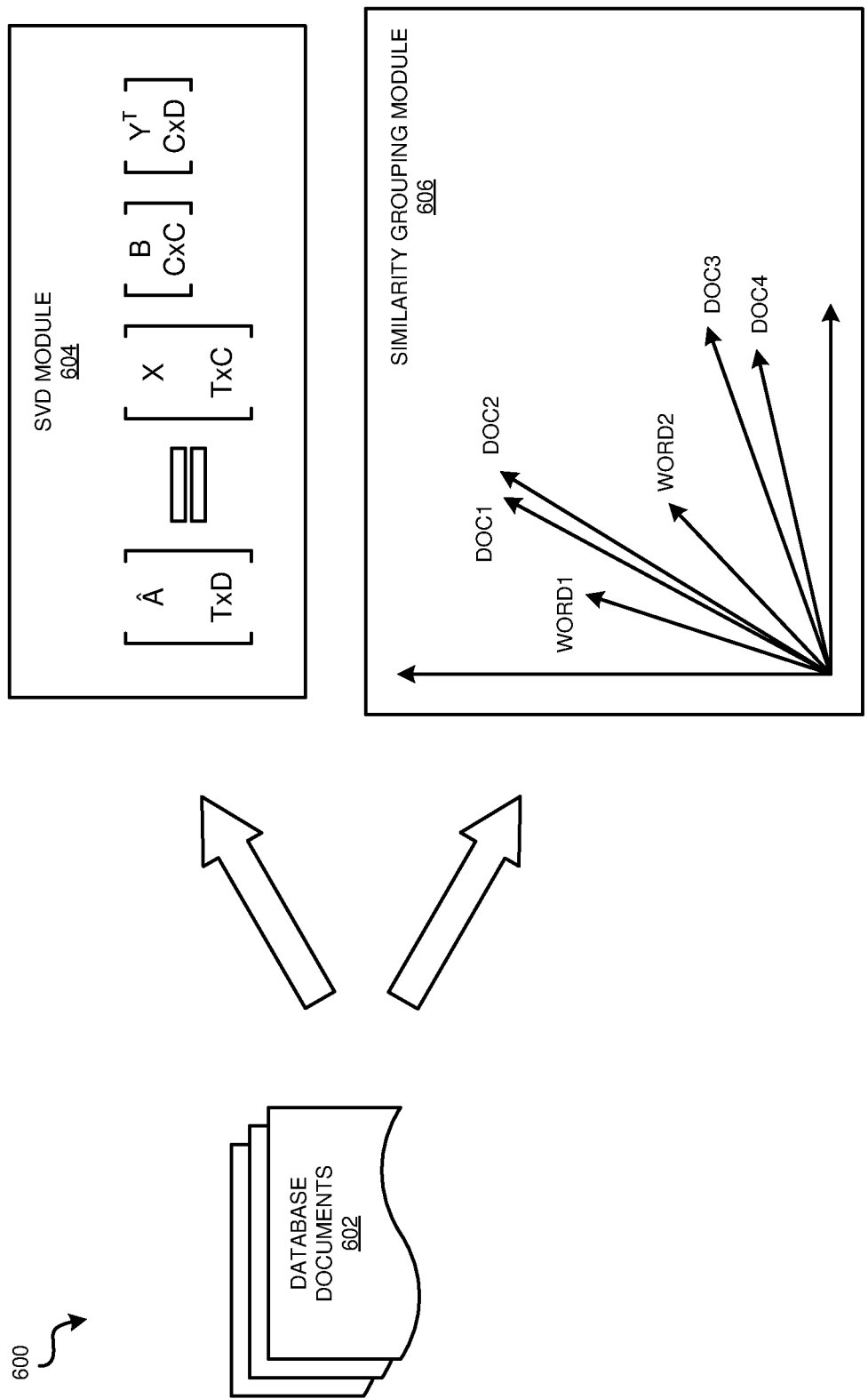
FIG. 6 depicts a block diagram of an example grouping module in accordance with an illustrative embodiment.

With reference to FIG. 6, this figure depicts a block diagram of an example grouping module 600 in accordance with an illustrative embodiment. In a particular embodiment, the grouping module 600 is an example of the grouping module 506 of FIG. 5.

In the illustrated embodiment, the grouping module 600 includes an SVD module 604 and a similarity grouping module 606. The grouping module 600 receives database documents 602, which are examples of documents from the querying module 502 of FIG. 5 that have been tokenized by the tokenizing module 504 of FIG. 5. In alternative embodiments, the grouping module 600 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the grouping module 600 uses LSI for comparing the similarity of data objects. LSI focuses upon that inherent structure of language, specifically the relationship between documents and terms, to register recurring patterns of semantic structure. Co-occurrences of terms are given higher weights than singular occurrences because the object of semantic indexing is to recognize which terms reappear most often in which parts of a document's structure. It has been demonstrated that there are a few constantly recurring structural patterns within sentences and these patterns occur at the level in which terms and their articles interrelate. The recurrence of these patterns is "latent" because they are inherent in grammatical structure and "semantic" because they define linguistic contextual meaning. In other words, through the pattern of co-occurrences of words, LSI is able to infer the structure of relationships between articles and words that define context and meaning by the relationship between structure and concept.

In alternative embodiments, other search techniques, such as Boolean, may be used instead of LSI. However, because LSI uses statistically representative information concepts based on the latent structure of information in the database documents 602, the user need not be an expert on the mass of information in the database documents 602. Specifically, the user need not know or understand the concepts used by the original authors of the information in the database documents 602 to accurately aggregate similar information from the database documents 602.

The SVD module 604 generates a reduced term-by-data matrix Â, which is a dimensionally-reduced version of term-by-data object matrix (A) that represents the frequency of term occurrence in the data objects from the database documents 602. Once term-by-document matrix A has been constructed, it is decomposed using SVD. The SVD of a real h×l matrix A is the factorization; the general case is represented by Expression (1).

$$A = XBY^T \qquad (1)$$

In Expression (1), the columns of X are the left singular vectors of A, the columns of Y are the right singular vectors of A, and B is a diagonal matrix whose diagonal entries are the singular values of A.

The dimensionality of A is then reduced, resulting in matrix Â shown in FIG. 6. This dimensional reduction is performed because many of the relationships are weak and the concepts are very small and not worth keeping. This reduced-dimension subspace is normally derived by selecting sub-matrices that correspond to the largest singular values and setting all other values to zero. Thus, in some embodiments, the SVD module 604 reduces the dimensionality of A by first reducing matrix B to keep only the C highest values. In doing so, matrices X, B, and $Y^T$ are reduced to having dimensions of T×C, C×C, and C×D, respectively, as can be seen in FIG. 6.

Once the concept reduction has been accomplished, multiplying X times B times $Y^T$ yields a term-by-data object matrix Â, with reduced term-by-data object matrix Â being slightly different than matrix A, but for the purposes of LSI, Â≅A. Reduced term-by-data object matrix Â is a mathematical representation of the semantic space for the original information corpus.

The similarity grouping module 606 then uses the term-by-data object matrix Â to find the similarity between database documents 602 and/or between terms contained in the database documents 602. In some embodiments, the similarity in the semantic space can be found by using a similarity metric. For example, in some embodiments, the similarity is determined by calculating the cosine of the angle between vector representations of words or documents. Words or documents are then grouped based on similarity values, for example by grouping words having similarity values below a user-set threshold value. The size or number of groups is controllable by the user by adjusting the threshold value of the similarity score used to distinguish the groups.

Figure 7:
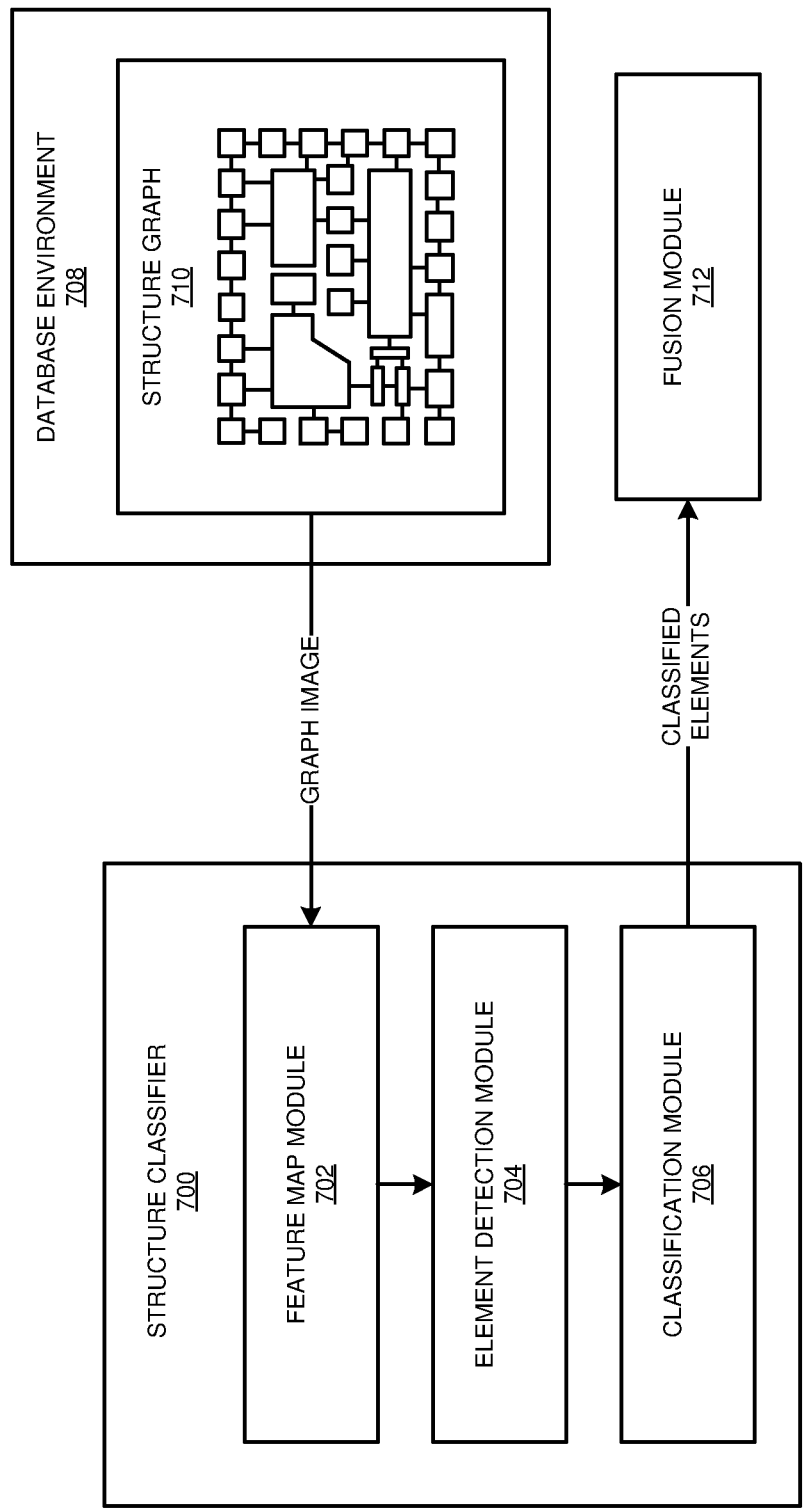
FIG. 7 depicts a block diagram of an example structure classifier in accordance with an illustrative embodiment.

With reference to FIG. 7, this figure depicts a block diagram of an example structure classifier 700 in accordance with an illustrative embodiment. In a particular embodiment, the structure classifier 700 is an example of the structure classifier 412 of FIG. 4.

In the illustrated embodiment, the structure classifier 700 includes a feature map module 702, an element detection module 704, and a classification module 706. The structure classifier 700 is in communication with database environment 708 and its structure graph 710, as well as with fusion module 712, which correspond with the database environment 418, structure graph 420, and fusion module 414, respectively, of FIG. 4. In alternative embodiments, the structure classifier 700 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the structure classifier 700 receives the structure graph 710 as an image that depicts the descriptions, organization, and interrelationships of architectural elements of the database environment 708. The structure classifier 700 analyzes the organization of the structure graph 710. For example, in some embodiments, the structure classifier 700 recognizes interrelationships between architectural elements of the structure graph 710 based on the image data of the structure graph 710. The structure classifier 700 outputs the classification results to the fusion module 712.

When the structure classifier 700 receives a structure graph for analysis, the feature map module 702 analysis the structure graph and generates a convolutional feature map (also referred to herein more simply as a "feature map") based on the image of the structure graph 710. In some embodiments, the feature map module 702 builds the feature map by applying one or more convolutional layers of a neural network to the image of the structure graph 710. In some embodiments, the feature map module 702 builds a plurality of feature maps by applying a plurality of convolutional layers of a neural network to the image of the structure graph 710.

In the illustrated embodiment, convolutional feature maps are used by the element detection module 704, which functions as a region-based detector that uses the feature maps to generate detection data indicative of detected elements in regions of the image of the structure graph. The methods and systems disclosed herein provide a way to detect architectural elements of a database environment 708. The methods are also used to detect structural or organizational aspects of the database environment 708. For example, the structure graph 710 includes nodes that represent architectural elements of the database environment and includes edges that represent associations, such as communication paths, between respective pairs of architectural elements. In some embodiments, the element detection module 704 detects nodes and further detects edges between nodes, allowing the structure classifier 700 to detect how nodes are arranged and connected. The element detection module 704 provides the detection data to the classification module 706 for classification processing.

The classification module 706 receives the detection data and classifies the detected object as a node or an edge. In some embodiments, if the classification module 706 classifies the object as a node, the classification module 706 will also classify the node according to the type of element that is represented by the node. In some embodiments, the classification module 706 classifies the nodes using the same classes of variation as the grouping module 506 of the content classifier 500. As the classification module 706 generates classification data, the classification module 706 outputs the classification data to the fusion module 712.

Figure 8:
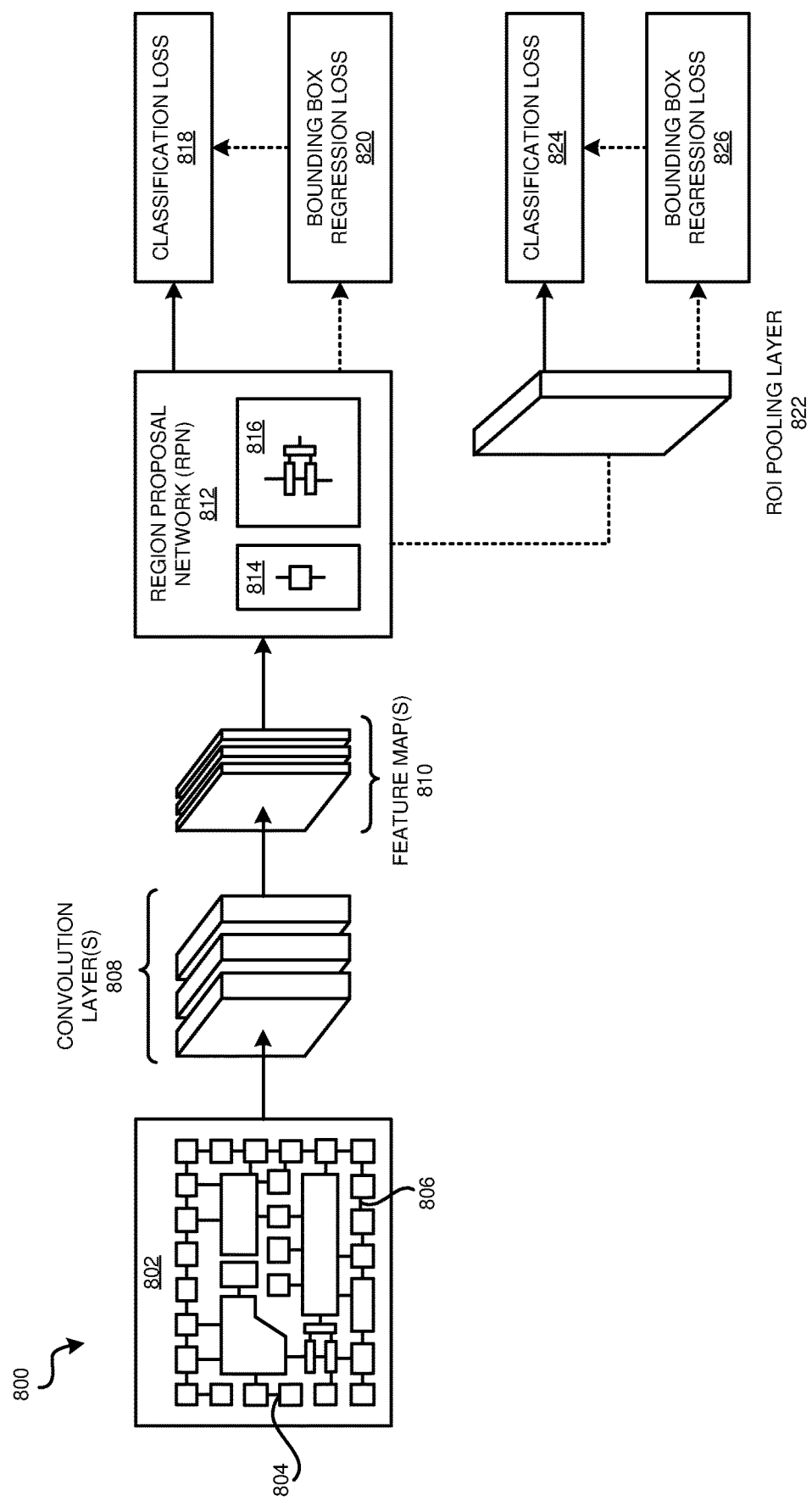
FIG. 8 depicts a schematic block diagram of an example architecture for a structure classifier in accordance with an illustrative embodiment.

With reference to FIG. 8, this figure depicts a schematic block diagram of an example architecture for a structure classifier 800 in accordance with an illustrative embodiment. In a particular embodiment, the structure classifier 800 is an example of the structure classifier 412 of FIG. 4.

In some embodiments, the structure classifier 800 is a type of region-based convolutional neural network (R-CNN), for example a Fast R-CNN or Faster R-CNN. The structure classifier 800 can be described as having two main portions, namely, (i) a region proposal portion, comprising one or more convolution layer(s) 808, one or more feature maps 810, and a region proposal network (RPN) 812, and (ii) a region of interest (ROI) analysis portion, comprising ROI pooling layer 822, a bounding box regression loss module 820 and a classification loss module 818 that are configured to analyze the content of the proposed regions. In some embodiments, there is a region of interest (ROI) pooling layer 822 coupled between a bounding box regression loss module 826 and a classification loss module 824. Both portions of the fast R-CNN cooperate to provide a network that is configured to identify nodes and edges, such as the one or more nodes 804 and one or more edges 806 of the structure graph 802.

The fast R-CNN uses a structure graph 802 as an input. The image of the structure graph 802 may include one or more nodes 804 and one or more edges 806.

A CNN, which may comprise one or more convolution layers 808, is applied to the structure graph 802 to produce one or more feature map(s) 810. Each of the convolution layers 808 can be interpreted as a separate filter that is configured to identify a different feature of the image, such as edges, corners, colors, curves, etc., or to scan a different region of the image. The more filters the structure classifier 800 includes, the more image features get extracted and the better the structure classifier 800 becomes at recognizing patterns in images.

A feature map 810 is the output received on convolving the structure graph 802 with a particular filter (i.e., convolution layer 808). The depth of the convolution layer(s) 808 depends on the number of filters that are used for the convolution operation, each providing a different feature map 810.

For each feature map 810, a sliding window (e.g., a filter) is run spatially across it to cover the feature map. For example, a sliding window may initially start in the top left corner of one of the feature maps 810 to convolve with the content. The sliding window then slides laterally across the feature map stepwise some distance to the right (e.g., 1 or more pixels at a time) across the feature map. In various embodiments, the stride (i.e., the number of pixels being shifted each time the sliding window is moved) may be different (e.g., 1, 2, x, etc.) Stated differently, the filter of the convolution layer, sometimes referred to as the kernel, only evaluates one patch of the feature map at a time, then moves to another patch of the feature map, and so on. In some embodiments, different sliding windows (i.e., of different size) may be used for different feature maps.

The RPN 812 creates a bounding box around each identified object, thereby identifying one or more regions of interest (ROI). For example, the RPN 812 can propose a fixed set of bounding boxes without considering the feature map(s) 810. The RPN 812 creates a fixed k anchor boxes and identifies those boxes as an object (i.e., node or edge) or not. Thus, the RPN 812 can create a fixed set of bounding boxes, where one or more of them may be around nodes and/or edges. The RPN 812 uses the feature map(s) 810 to evaluate each bounding box.

Significantly, the objects identified are not limited to a single edge or single node (e.g., bounding box 814 around a node); rather, groups of nodes (e.g., bounding box 816 around a group of nodes) are intentionally included as well. For example, the RPN 812 may recognize a group of nodes may be classified together or simultaneously because either the nodes actually work together to perform a single function, or a group of nodes are redundant to each other, or a group of nodes are identical to each other.

In the illustrated embodiment, during the ROI analysis portion, for each bounding box, the object therein is classified as a node or edge by the classification loss module 818. In one embodiment, bounding boxes that were classified as a node, but have been identified to be an edge (i.e., a hard negative), are then used as part of the training set for subsequent RPNs, thereby iteratively improving the RPN 812 and the classifier 818. In some embodiments, for each identified node of the classifier, the class classification may continue to further identify a type of node by the classification loss module 818.

In one embodiment, each bounding box introduced by the RPN 812 (e.g., 814, 816) is processed by a bounding box regression loss module 820, which is configured to refine the center point of the bounding box and its dimensions to better capture the object therein. The classification loss module 818 indicates how training penalizes the deviation between the predicted and actual classification labels. In various embodiments, Sigmoid cross-entropy loss may be used for predicting K independent probability values in [0,1], and SoftMax function (sometimes referred to a normalized exponential function) may be used for predicting a single class of K mutually exclusive classes.

In one embodiment, there is a region of interest (ROI) pooling layer 822 that is configured to combine the outputs of the RPN 812 into a single layer, thereby reducing the volume of data. In various embodiments, max pooling, average pooling, or minimum pooling can be used. For example, max pooling uses the maximum value from each of a cluster of neurons at the prior layer. Another example is average pooling, which uses the average value from each of a cluster of neurons at the prior layer. The output is then provided to the classification loss module 818 to continue the classification.

Figure 9:
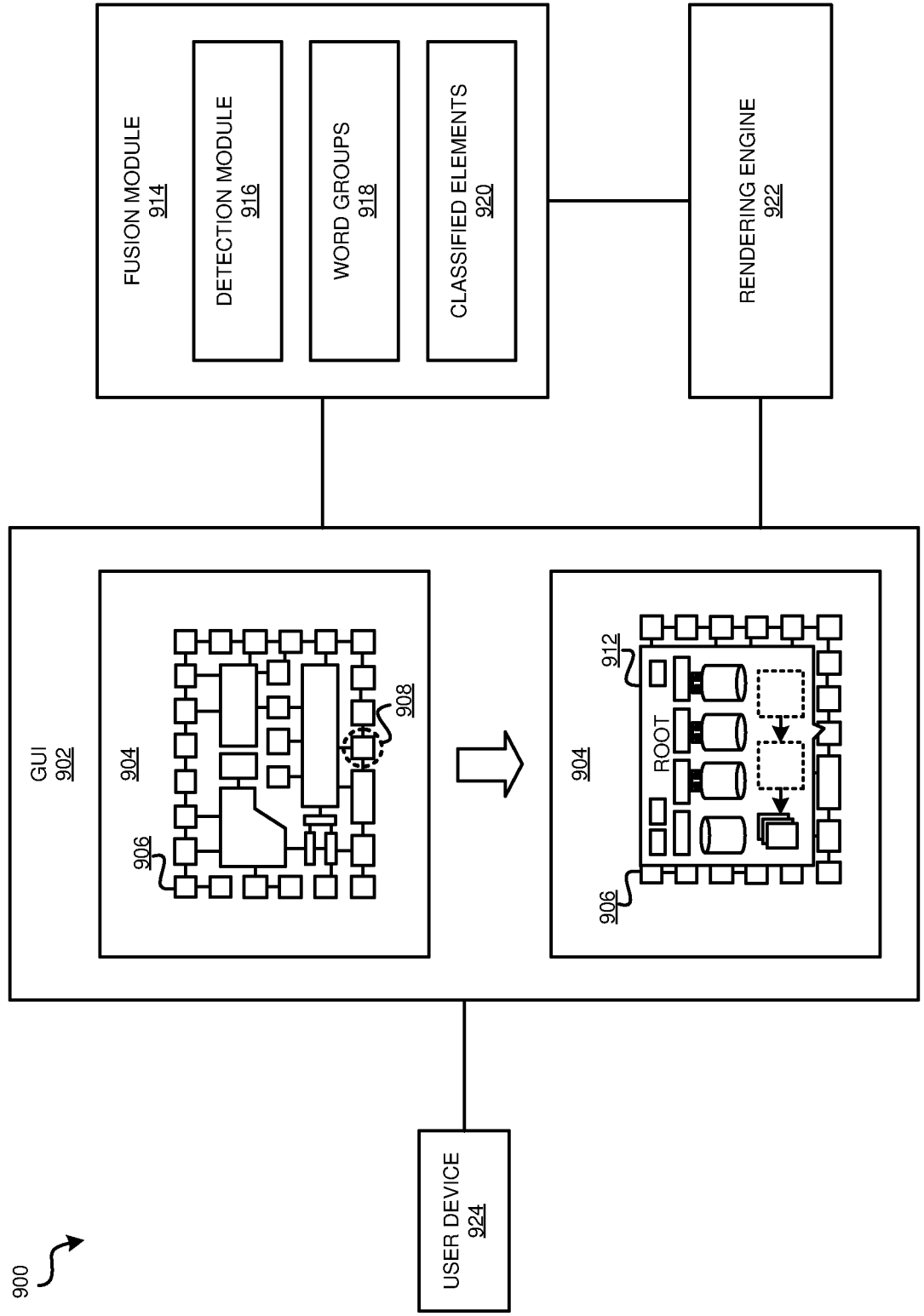
FIG. 9 depicts a schematic block diagram of an example fusion and rendering portion of an SGR system in accordance with an illustrative embodiment.

With reference to FIG. 9, this figure depicts a schematic block diagram of an example fusion and rendering portion 900 of an SGR system in accordance with an illustrative embodiment. In a particular embodiment, the fusion and rendering portion 900 is an example of the fusion and rendering portion of SGR system 400 of FIG. 4.

In the illustrated embodiment, the fusion and rendering portion 900 includes a fusion module 914, a rendering engine 922, and a GUI 902. In some embodiments, the fusion module 914, rendering engine 922, and GUI 902 correspond with the fusion module 414, rendering engine 416, and GUI 408 of FIG. 4. In alternative embodiments, the structure classifier 700 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the GUI 902 displays a rendering 904 of an interactive structure graph 906. The GUI 902 is in communication with a user device 924 such that the user device 924 provides the rendering on a display for a user. The interactive structure graph 906 differs from the static image version of the structure graph (e.g., static image structure graph 420 of FIG. 4) in that the interactive structure graph 906 responds to certain user inputs by providing details and connected elements for a selected node. For example, in the illustrated embodiment, if a user taps or clicks on a node, such as node 908, this node is enclosed in a broken line to indicate that a user interaction with that node has occurred.

The block arrow indicates the transformation of the rendered display that occurs responsive to the user interaction with node 908. When the user tapped or clicked on the node 908, an overlay 912 appeared over the interactive structure graph 906 that includes details for node 908. In various embodiments, the overlay 912 may include information about the device represented as node 908, such as the name and type of device, various attributes for the device, such as the device's specifications and/or current status, as well as structural information, such as an indication of other elements that are directly connected to the node 908.

In order to display the overlay 912 in response to the user input, the fusion module 914 includes a detection module 916 that is alerted to a user action, such as selection of a node. The fusion module 914 also stores the word groups 918 generated by the content classifier 410 of FIG. 4 and the classified elements 920 generated by the structure classifier 412 of FIG. 4. The fusion module 914 locates the word group 918 and classified element 920 that correspond with the selected node 908 and forwards the information located for node 908 to the rendering engine 922.

The rendering engine 922 then assembles the overlay 912 using the information for node 908 received from the fusion module 914. For example, in some embodiments, the rendering engine follows a template or set of rules for rendering the overlay based on the information available and/or the type of device that has been selected. The rendering engine 922 then transfers instructions for the GUI 902 to display the overlay 912. The GUI then displays the information on the overlay 912 for the user to observe in a convenient summary rather than seek out the information elsewhere.

Figure 10:
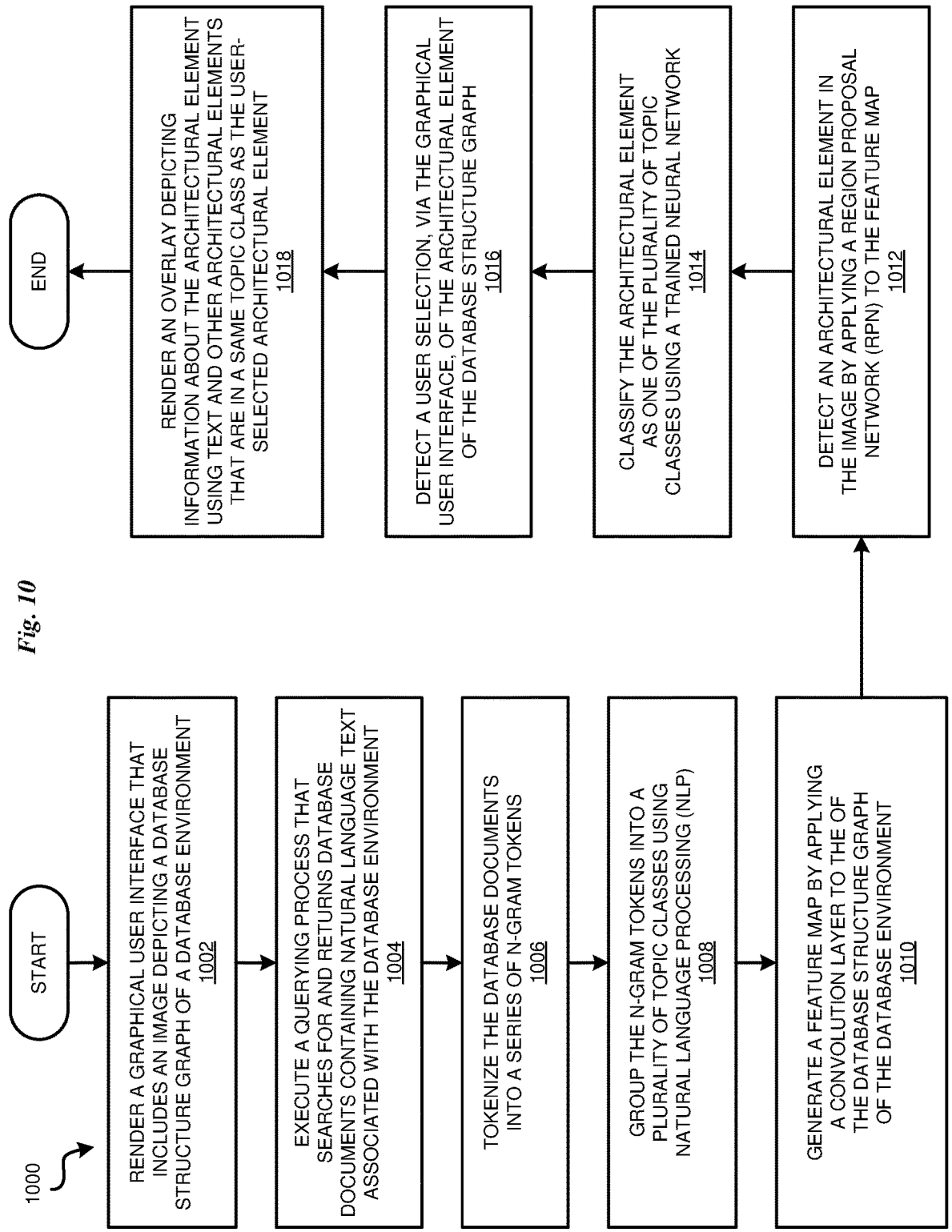
FIG. 10 depicts a flowchart of an example process for cognitive recognition and reproduction of structure graphs in accordance with an illustrative embodiment.

With reference to FIG. 10, this figure depicts a flowchart of an example process 1000 for cognitive recognition and reproduction of structure graphs in accordance with an illustrative embodiment. In a particular embodiment, the SGR system 400 carries out the process 1000.

In an embodiment, at block 1002, the process renders a GUI that includes an image depicting a database structure graph of a database environment. Next, at block 1004, the process executes a querying process that searches for and returns database documents containing natural language text associated with the database environment. Next, at block 1006, the process tokenizes the database documents into a series of n-gram tokens.

Next, at block 1008, the process groups the n-gram tokens into a plurality of topic classes using NLP. In some embodiments, the process groups the n-gram tokens by analyzing objects returned from the query using an LSI model that measures similarities between database documents based upon similar word usage patterns.

Next, at block 1010, the process generates one or more feature maps by applying one or more a convolution layers to the of the database structure graph. In some embodiments, the feature maps are generated by convolution layers of an R-CNN.

Next, at block 1012, the process detects an architectural element in the image by applying an RPN to one of the feature maps. In some embodiments, the RPN creates a bounding box around the detected architectural element in the image. In some such embodiments, the process includes training the R-CNN using a bounding box regression layer associated with a loss function that compares created bounding boxes to ground truth bounding boxes. In some such embodiments, the bounding box regression layer refines center points and dimensions of created bounding boxes based on comparison results with ground truth bounding boxes.

Next, at block 1014, the process classifies the architectural element as one of the plurality of topic classes using a trained neural network. In some such embodiments, the process classifies architectural elements in each of a plurality of respective bounding boxes. In some such embodiments, the process uses a trained neural network to classify each of the architectural elements.

Next, at block 1016, the process detects a user selection, via the GUI, of the architectural element of the database structure graph. Next, at block 1018, the process renders an overlay depicting information about the architectural element using text and other architectural elements that are in a same topic class as the user-selected architectural element.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
executing, by a content classifier, a querying process that searches for and returns a first database document and a second database document each containing natural language text associated with a database environment;
tokenizing, by the content classifier, the first and second database documents into a series of n-gram tokens;
grouping, by the content classifier, the n-gram tokens into a plurality of topic classes using natural language processing (NLP);
generating, by a structure classifier, a feature map by applying a convolution layer to an image that depicts a database structure graph of the database environment, wherein nodes of the database structure graph represent architectural elements of the database environment and edges of the database structure graph represent associations between respective pairs of architectural elements;

detecting, by the structure classifier, an architectural element in the image by applying a region proposal network (RPN) to the feature map;

classifying, by the structure classifier, the architectural element into one of the plurality of topic classes using a trained neural network; and rendering, responsive to detecting a user selection of the architectural element via a graphical user interface that depicts at least a portion of the database structure graph, an overlay depicting information about the architectural element using text and other architectural elements that are in a same topic class as the user-selected architectural element.

2. The method of claim 1, further comprising creating, by the RPN, a bounding box around the detected architectural element in the image.

3. The method of claim 2, wherein the structure classifier comprises a Region Based Convolutional Neural Network (R-CNN) that performs the generating of the feature map, the detecting of the architectural element, and the classifying of the architectural element.

4. The method of claim 3, further comprising training the R-CNN using a bounding box regression layer associated with a loss function that compares created bounding boxes to ground truth bounding boxes.

5. The method of claim 4, wherein the bounding box regression layer refines center points and dimensions of created bounding boxes based on comparison results with ground truth bounding boxes.

6. The method of claim 1, wherein the generating of the feature map further comprises applying a plurality of convolution layers to the image to create a plurality of respective feature maps.

7. The method of claim 6, further comprising creating, by the RPN, bounding boxes around respective architectural elements in each of the plurality of feature maps.

8. The method of claim 7, wherein the classifying of the architectural element further comprises classifying architectural elements in each of the respective bounding boxes, wherein the classifying comprises classifying each of the architectural elements as one of the plurality of topic classes using the trained neural network.

9. The method of claim 1, further comprising resizing the feature map using a pooling layer that adjusts a size dimension of the feature map to a predetermined value specified as a hyperparameter.

10. The method of claim 1, wherein the grouping of the n-gram tokens into the plurality of topic classes comprises processing said database documents according to a latent semantic indexing (LSI) model that measures similarities between database documents based upon similar word usage patterns.

11. A computer program product, the computer program product comprising one or more computer readable storage media, and program instructions collectively stored on the one or more computer readable storage media, the program instructions executable by one or more processors to cause the one or more processors to perform operations comprising:

executing, by a content classifier, a querying process that searches for and returns a first database document and a second database document each containing natural language text associated with a database environment;

tokenizing, by the content classifier, the first and second database documents into a series of n-gram tokens;

grouping, by the content classifier, the n-gram tokens into a plurality of topic classes using natural language processing (NLP);

generating, by a structure classifier, a feature map by applying a convolution layer to an image that depicts a database structure graph of the database environment, wherein nodes of the database structure graph represent architectural elements of the database environment and edges of the database structure graph represent associations between respective pairs of architectural elements;

detecting, by the structure classifier, an architectural element in the image by applying a region proposal network (RPN) to the feature map;

classifying, by the structure classifier, the architectural element into one of the plurality of topic classes using a trained neural network; and rendering, responsive to detecting a user selection of the architectural element via a graphical user interface that depicts at least a portion of the database structure graph, an overlay depicting information about the architectural element using text and other architectural elements that are in a same topic class as the user-selected architectural element.

12. The computer program product of claim 11, wherein the stored program instructions are stored in a computer readable storage device in a data processing system, and wherein the stored program instructions are transferred over a network from a remote data processing system.

13. The computer program product of claim 11, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

14. The computer program product of claim 11, wherein the operations further comprise creating, by the RPN, a bounding box around the detected architectural element in the image.

15. The computer program product of claim 14, wherein the structure classifier comprises a Region Based Convolutional Neural Network (R-CNN) that performs the generating of the feature map, the detecting of the architectural element, and the classifying of the architectural element.

16. The computer program product of claim 15, wherein the operations further comprise training the R-CNN using a bounding box regression layer associated with a loss function that compares created bounding boxes to ground truth bounding boxes.

17. A computer system comprising one or more processors and one or more computer readable storage media, and program instructions collectively stored on the one or more computer readable storage media, the program instructions executable by the one or more processors to cause the one or more processors to perform operations comprising:

executing, by a content classifier, a querying process that searches for and returns a first database document and a second database document each containing natural language text associated with a database environment;

tokenizing, by the content classifier, the first and second database documents into a series of n-gram tokens;
  grouping, by the content classifier, the n-gram tokens into a plurality of topic classes using natural language processing (NLP);
  generating, by a structure classifier, a feature map by applying a convolution layer to an image that depicts a database structure graph of the database environment, wherein nodes of the database structure graph represent architectural elements of the database environment and edges of the database structure graph represent associations between respective pairs of architectural elements;
  detecting, by the structure classifier, an architectural element in the image by applying a region proposal network (RPN) to the feature map;
classifying, by the structure classifier, the architectural element into one of the plurality of topic classes using a trained neural network; and
  rendering, responsive to detecting a user selection of the architectural element via a graphical user interface that depicts at least a portion of the database structure graph, an overlay depicting information about the architectural element using text and other architectural elements that are in a same topic class as the user-selected architectural element.

18. The computer system of claim 17, wherein the operations further comprise creating, by the RPN, a bounding box around the detected architectural element in the image.

19. The computer system of claim 18, wherein the structure classifier comprises a Region Based Convolutional Neural Network (R-CNN) that performs the generating of the feature map, the detecting of the architectural element, and the classifying of the architectural element.

20. The computer system of claim 19, wherein the operations further comprise training the R-CNN using a bounding box regression layer associated with a loss function that compares created bounding boxes to ground truth bounding boxes.

* * * * *